Patented Aug. 4, 1953

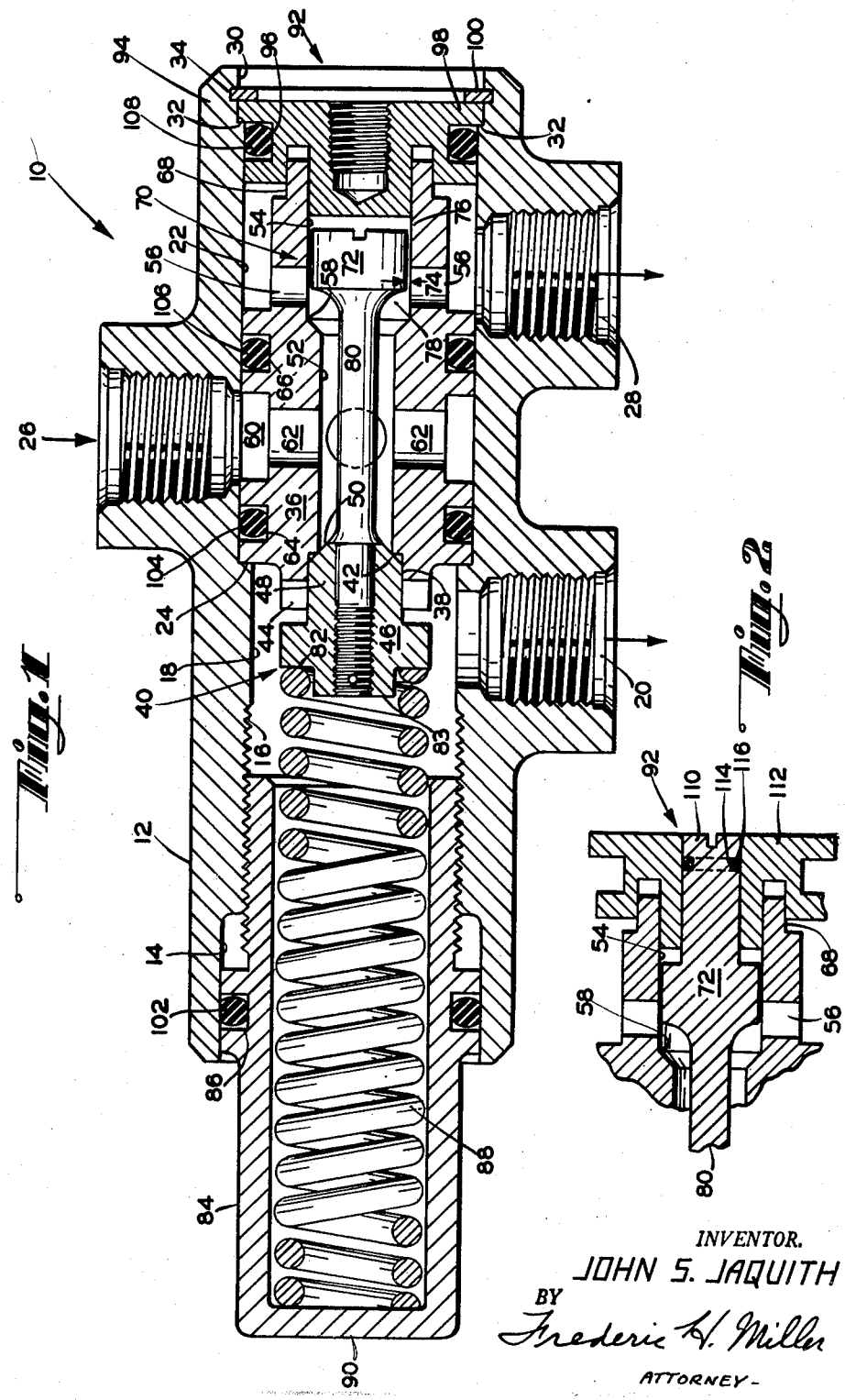

2,647,530

UNITED STATES PATENT OFFICE 2,647,530

UNLOADER VALVE

John S. Jaquith, Caldwell, N. J., assignor to Bendix Aviation Corporation, Teterboro, N. J., a corporation of Delaware Application January 30, 1948, Serial No. 5,371

4 Claims. (Cl. 137—108)

The present invention relates to fluid control devices, and particularly to valves of the pump unloading or relief types.

An object of the invention is to provide a valve which will relieve a pump at a certain high pressure in an accumulator supplied by the pump, and which will hold the pump discharge fully open until the attainment of a relatively exact substantially lower pressure when the loading of the pump will be resumed.

Another object is to maintain the size of a certain control spring relatively small in valves of larger sizes, or higher pressures by diminishing the effective areas acted upon by the pressures, while maintaining sufficient flow.

Another object is to provide a valve which, by a judicious selection and location of ring seals, may be constructed of parts of easy manufacture and assembly from the standpoint of tolerances and fit, and be as effective as a more expensively constructed valve.

Another object is to provide novel means whereby fluid control means in a housing or fluid container may be adjusted from the exterior of the housing while maintaining the housing effectively sealed.

Another object is to provide a pump unloading valve unit to have novel relief and check valve components, in which the unit may, by the simple expedient of closing the check valve outlet, be operated solely as a relief valve, and which has other advantageous features.

Another object is to provide a device of the above-indicated character which is simple and durable in construction economical to manufacture, and effective in its operation.

The above and other objects and features of the invention will appear more fully hereinafter from a consideration of the following description taken in connection with the accompanying drawing wherein two embodiments of the invention are illustrated by way of example.

In the drawing:

Figure 1 is a side view generally in section, but having parts in elevation, of a pump unloading valve constructed in accordance with one form of the invention; and Figure 2 is a detail section of parts as viewed near the right end of Figure 1, but as modified in accordance with the invention in another form.

Referring to Figure 1, a pump unloading valve 10 comprises a housing portion 12 having, in the position shown, from left to right substantially in the order named, a seal bore 14, an internally threaded portion 16 and a second bore 18 of smaller diameter than the bore 14, with the bore 18 having an outlet 20 for connection to a pump reservoir or drain, and a third bore 22, of larger diameter than the bore 18 to provide a shoulder 24, and having an inlet 26 for receiving fluid from a pump discharge.

The third bore 22, which has an outlet 28 adapted for connection to an accumulator, extends to a right-end bore 30, forming a second shoulder 32, and having a groove 34 between the second shoulder 32 and the right end of the bore 30.

A sleeve 36, in the bore 22 against the first shoulder 24, includes interiorly from left to right, a relief valve cylindrical bore 38 of a relief valve 40 having an annular seat 42 of less diameter than the bore 38 and axial slots 44 peripherally spaced about the bore 38 spaced axially from the seat 42.

The relief valve 40 further comprises a valve member 46 having a cylindrical body 48 slidably fitting the bore 38 and a tapered portion 50 for engaging the edge of the seat 42 tangentially to the tapered portion 50. An intermediate bore or chamber 52 is smaller than the relief valve bore 38, and a check valve chamber bore 54, larger than the intermediate bore 52, has side port means 56.

The intermediate bore 52 has the relief valve seat 42 and a check valve seat 58 at its left and right-hand ends, respectively, and is provided between the seats 42 and 58 with an annular outer channel 60 and lateral passages 62 connected to the inlet 26.

The sleeve 36 is provided exteriorly with annular lateral seal channels 64 and 66 axially at opposite sides of the fluid channel 60, and is provided with a right-end portion 68 of reduced diameter.

A check valve 70 includes a piston body 72 having a definite clearance 74 relative to the check valve chamber wall 76. The clearance 74 provides means whereby fluid in the system may get behind the piston 72 to the end that pressure of the fluid may be utilized to actuate the valve in one direction, as will hereinafter be more fully set forth. In addition, the clearance 74 permits a restricted flow of fluid from behind the piston 72 under conditions where the piston 72 is moving away from its coacting seat 58. Due to this restricted flow of fluid, the piston 72 operates with a dashpot effect in the check valve chamber 78 to prevent excess chattering and hammering of the valve 10.

The check valve 70 includes a stem 80, extending from the piston body 72 through the intermediate bore 52 to the relief valve member 46 which is provided with a spring-receiving seat 82 and centering projection 83.

A cup 84, extending open end first into the seal bore 14 threaded to the portion 16, is provided with an outer lateral annular seal channel 86 in the seal bore 14, and is adapted to receive a spring 88 under compression between the closed cup end 90 and the spring seat 82 on the relief valve member 46.

A closure structure 92, for the right end 94 of housing portion 12, fits within the end 94, in telescopic engagement with the right-end reduced sleeve portion 68, and has a center portion that fits within the check valve chamber bore to form the outer wall of the check valve chamber. Closure 92 is provided with a seal channel 96, the right side 98 of which abuts the second shoulder 32. A lock ring 100 is provided in the groove 34, and ring seals 102, 104, 106 and 108 are disposed in the seal channels 86, 64, 66 and 96, respectively.

In operation, oil from the pump enters the valve 10 of Figure 1 at the inlet 26 and passes into the chamber 52 from which it flows through the check valve 70 and exits to the system and accumulator through the outlet 28. The sleeve 36 is always fixed, since it is pressure-forced against the shoulder 24.

With the parts in the position shown in Fig. 1, fluid under pressure from the pumping means enters inlet 26 and flows through chamber 52 and ports 56 to the outlet 28 and thence to the accumulator. During this flow of the fluid, the pressure within the valve bore or chamber 52 and the accumulator are substantially equal and produces two forces acting in an axial direction to unseat the valve member 46 from its sealing engagement with its coacting seat 42. One of these forces results from the pressure acting on the exposed or effective area of the valve member 46 at seat 42, while the other results from the pressure passing through clearance 74 and acting on the outer or right surface of the piston 72. Opposing the forces above set forth, are two forces acting in an axial direction to engage the valve member 46 with its seat 42. These forces result from the pressure acting on the inner or left hand side of the piston 72 and the force exerted by the spring 88.

As hereinbefore set forth, there are two forces resulting from the pressure of the fluid tending to move the valve 46 away from its seat 42, and one force resulting from fluid pressure tending to move the valve member 46 in a direction toward its coacting seat 40. Since the pressure of the fluid is effective on valve member 46 and the area of the right or outer side of the piston 72 and therefore acts upon an area substantially greater than the effective area of the left or inner surface of the piston 72, it is apparent that insofar as the effect of the fluid pressure, there is a net force developed tending to move the valve member 46 away from its seat 42. Moreover, due to the construction and design of the tapered section 50 of the valve member 46, stem 80, piston 72 and bore 52, the difference in the areas which results in the net force above set forth, is substantially equal to the cross-sectional area of the bore 52. Thus, a force developed by the fluid pressure and tending to unseat the valve 46 is produced and this force is biased or opposed by the force exerted by the spring 88.

When the fluid pressure within the valve 10 and the accumulator reaches a predetermined maximum, for example 1500 p. s. i., the net force resulting from the fluid pressure overcomes the biasing force of the spring 88 and moves the valve member 46 away from its seat 42. Upon the initial movement of the valve member 46, a larger area thereof is exposed to the fluid pressure in bore 52. Therefore, the force resulting from the fluid pressure is increased and the valve member 46 continues to move away from its seat 42 until an initial restricted flow is established between the bore 52 and the slots 44 whereupon the fluid pressure in the bore 52 decreases in value and hence the force tending to unseat valve 46 also decreases. However, during this movement of valve member 46, the piston 72 has moved to a position where it covers the ports 56. Due to the clearance 74, the full fluid pressure in the accumulator is made available to act upon the right or outer surface of the piston 72 where it serves to produce a force of sufficient value to rapidly move the valve member 46 to a fully open position and the piston 72 to a fully closed position. Since the valve 46 is fully open, the fluid pressure in bore 52 drops to substantially zero, while piston 72 being seated prevents any pressure from the accumulator from entering the bore 52. Thus, valve member 46 and piston 72 are held in position by the fluid pressure from the accumulator, which acting on the outer surface of piston 72, produces a force sufficient to overcome the biasing force of the spring 88.

Since the force opposing the spring 88 is a function of the pressure in the accumulator, it is apparent that as the pressure in the accumulator decreases the force opposing spring 88 also decreases. Thus, at a predetermined value, for example, 1000 p. s. i., the spring 88 overcomes the force opposing it and moves the valve member 46 toward its seat 42 and concurrently moves the piston 72 away from its seat 58. Concurrently with the re-entry of valve member 46 into the bore 38, the piston 72 uncovers the ports 56 and the pressure within the bores 52 and 38 equalizes with the pressure in the accumulator. However, at this point the pressure within the accumulator is at the lowered value of 1000 p. s. i. Thus, force developed by this lower pressure acting on the effective areas of the valve member 46, in the bore 38, and the right hand surface of the piston 72 is not sufficient to overcome the forces exerted by the spring 88 and the effective area of the left hand or inner surface of the piston 72. The valve member 46 and piston 72 are therefore moved to closed and opened positions respectively. The rate of the spring 88 is designed to effect a closing of the relief valve 46 and an opening of the check valve 70 in the presence of this lowered pressure within the valve bore 52 and the accumulator.

It is to be noted, that as the piston 72 moves away from its seat 58, the clearance 74 permits a flow of fluid from bore 54 to the port 56, thus, this restricted flow of fluid operates as a dashpot to dampen the action of the valve 10 in returning the check valve 70 to open position.

As shown in Figure 2, a balance piston or plunger 110 on the piston 72, for reducing the area of the piston, axially slidably fits a cylinder 112 in the closure 92. The plunger 110 is provided with a groove 114 for the reception of a sliding ring seal 116 compressed between the closure 92 and the plunger 110. Thus, in valves of larger sizes or higher pressures, the spring 88 may be maintained relatively small, while maintaining sufficient flow, by the reduction in the area of the piston 72 effected by the addition of the plunger 110, which, of course, may be of any of different diameters.

Also, by plugging the outlet 28, the device may be operated as a straight relief valve.

Although only two embodiments of the invention have been illustrated and described, various changes in the form and relative arrangements of the parts may be made to suit requirements.

What is claimed is:

1. A valve comprising a housing portion having, in one position from left to right, a longitudinal seal bore, an internally threaded portion, a second bore communicating with said seal bore and colinear therewith having an outlet for connection to a pump reservoir, and a third bore colinear with said seal bore and second bore and communicating therewith providing a shoulder and having an inlet for receiving fluid from a pump discharge, the third bore having an outlet adapted for connection to an accumulator and having a right-end bore forming a second shoulder and having a groove between the second shoulder and the right end; a sleeve in the third bore against the first shoulder including interiorly from left to right a relief valve bore having side slots, an intermediate bore smaller than the relief bore and a check valve chamber bore larger than the intermediate bore having side port means, the intermediate bore having relief and check valve seats at its left and right-hand ends, respectively, and being provided between the seats with a channel and passages to the inlet, the sleeve having exteriorly an annular fluid channel laterally opposite said inlet, annular lateral seal channels axially at opposite sides of the fluid channel and a right-end portion of reduced outer diameter, a check valve operative as a dashpot in the check-valve chamber having definite fluid-flow clearance relative to the chamber wall including a stem extending from the check valve through the intermediate bore, a valve member on the stem for the relief valve seat and having a spring seat, a cup extending open end first into the seal bore threaded to said interiorly threaded portion and having an outer seal channel in the seal bore, a spring in the cup under compression between the closed cup end and said spring seat, a closure fitting within the right-end of the housing, and in telescopic engagement with the right-end reduced sleeve portion, said closure having a center portion fitting within said check valve chamber to form the outer wall thereof, and having a seal channel the right side of which abuts said second shoulder, a lock ring in the groove holding the closure in position, and a ring seal in each of said seal channels.

2. A valve comprising a housing portion having, in one position from left to right, a longitudinal seal bore, an internally threaded portion, a second bore communicating with said bore and colinear therewith having an outlet for connection to a pump reservoir, and a third bore colinear with said seal bore and second bore and communicating therewith providing a shoulder and having an inlet for receiving fluid from a pump discharge, the third bore having an outlet adapted for connection to an accumulator and having a right-end bore forming a second shoulder and having a lock groove between the second shoulder and the right end; a sleeve in the third bore against the first shoulder including interiorly from left to right a relief valve bore having side slots, an intermediate bore smaller than the relief bore and a check valve chamber bore larger than the intermediate bore having side port means, the intermediate bore having relief and check valve seats at its left and right-hand ends, respectively, and being provided between the seats with a channel and passages to the inlet, the sleeve having exteriorly an annular fluid channel laterally opposite said inlet, annular lateral seal channels axially at opposite sides of the fluid channel and a right-end portion of reduced outer diameter, a check valve operative as a dashpot in the check-valve chamber having definite fluid-flow clearance relative to the chamber wall, the check valve including a stem having a reduced diameter portion, said stem extending from said check valve through the intermediate bore and said reduced diameter portion extending oppositely therefrom and having an annular outer seal groove, a valve member on the stem for the relief valve seat and having a spring seat, a cup extending open end first into the seal bore threaded to said interiorly threaded portion and having an outer seal channel in the seal bore, a spring in the cup under compression between the closed cup end and said spring seat, a closure fitting within the right-end of the housing, and in telescopic engagement with the right-end reduced sleeve portion, said closure having a center portion fitting within said check valve chamber to form the outer wall thereof, said reduced diameter portion of said stem slidably mounted in the center portion of said closure, said closure having a seal channel the right side of which abuts said second shoulder, a lock ring in the lock groove holding the closure in position, a seal ring in said seal groove, and a ring seal in each of said seal channels.

3. A valve comprising a housing having a longitudinal bore, cap and closure means carried by the opposed ends of said housing for closing said bore, an inlet in one side of said housing adapted to receive fluid under pressure from a discharge pump, outlet ports in the opposite side of said housing and axially disposed at either side of said inlet port, a sleeve mounted in said bore and closed at one end by said closure, means communicating said inlet port to the interior of said sleeve, outlet means including valve seats adjacent the opposite ends of said sleeve affording communication between the interior of said sleeve and said outlet ports, valve means slidably mounted in said sleeve and constructed and arranged to establish communication between said inlet port and one or the other of said outlet ports, and a chamber in the end of said sleeve closed by said closure, said valve means including a piston portion slidably mounted in said chamber and having a predetermined clearance relative to the wall of said chamber providing a restricted flow of fluid between said piston and chamber wall, to dampen movement of said valve means in one direction.

4. A valve comprising a housing having a longitudinal bore, cap and closure means carried by the opposed ends of said housing for closing said bore, an inlet in one side of said housing adapted to receive fluid under pressure from a discharge pump, outlet ports in the opposite side of said housing and axially disposed at either side of said inlet port, a sleeve mounted in said bore and having one end thereof telescopingly engaging said closure and closed by said closure, means communicating said inlet port to the interior of said sleeve, outlet means including valve seats adjacent the opposite ends of said sleeve affording communication between the interior of said sleeve and said outlet ports, valve means slidably mounted in said sleeve and constructed and arranged to establish communication between one or the other of said outlet ports, a chamber in the end of said sleeve closed by said closure, said valve means including a piston portion slidably mounted in said chamber and having a predetermined clearance relative to the wall of said chamber providing a restricted flow of fluid between said piston and chamber wall whereby movement of said valve means in one direction is dampened, and an extension on said piston slidably and sealingly mounted in said closure.

JOHN S. JAQUITH.

References Cited in the file of this patent

UNITED STATES PATENTS

| Number | Name | Date |
|---|---|---|
| 313,249 | Styne | Mar. 3, 1885 |
| 891,284 | Nethery | June 23, 1908 |
| 2,196,120 | Parker | Apr. 2, 1940 |
| 2,235,858 | Williams | Mar. 25, 1941 |
| 2,326,462 | Johnson | Aug. 10, 1943 |
| 2,375,411 | Grant | May 8, 1945 |
| 2,391,790 | Martinsson | Dec. 25, 1945 |
| 2,395,941 | Rockwell | Mar. 5, 1946 |
| 2,496,577 | Cahill | Feb. 7, 1950 |

FOREIGN PATENTS

| Number | Country | Date |
|---|---|---|
| 506,088 | Great Britain | May 23, 1939 |